United States Patent
Qiu (10) Patent No.: US 11,743,258 B2
(45) Date of Patent: Aug. 29, 2023

(54) ACCESS AUTHENTICATING (71) Applicant: New H3C Technologies Co., Ltd., Zhejiang (CN)

(72) Inventor: Yuanxiang Qiu, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 393 days.

(21) Appl. No.: 17/276,387

(22) PCT Filed: Sep. 19, 2019

(86) PCT No.: PCT/CN2019/106605
§ 371 (c)(1),
(2) Date: Mar. 15, 2021

(87) PCT Pub. No.: WO2020/057585
PCT Pub. Date: Mar. 26, 2020

(65) Prior Publication Data
US 2021/0409407 A1 Dec. 30, 2021

(30) Foreign Application Priority Data
Sep. 21, 2018 (CN) .......................... 201811109298.4

(51) Int. Cl.
H04L 9/40 (2022.01)
(52) U.S. Cl.
CPC ...... *H04L 63/0892* (2013.01); *H04L 63/0236* (2013.01); *H04L 63/102* (2013.01); *H04L 63/20* (2013.01)
(58) Field of Classification Search
CPC ............. H04L 63/0892; H04L 63/0236; H04L 63/102; H04L 63/20; H04L 63/08; H04W 12/06
See application file for complete search history.

(56) References Cited

U.S. PATENT DOCUMENTS 8,891,498 B2  11/2014  Zhang et al.
9,113,332 B2  8/2015  Bournelle et al.
(Continued)

FOREIGN PATENT DOCUMENTS

CN  1662092 A  8/2005
CN  101765114 A  6/2010
(Continued)

OTHER PUBLICATIONS

State Intellectual Property Office of the People's Republic of China, Office Action and Search Report Issued in Application No. 2018111092984, dated Dec. 18, 2019, 20 pages. (Submitted with Machine translation).

(Continued)

*Primary Examiner* — Huan V Doan
(74) *Attorney, Agent, or Firm* — GREENBLUM & BERNSTEIN, P.L.C.

(57) ABSTRACT

A method and an apparatus for authenticating an access are provided. When a first interface of a BRAS device does not find a user entry corresponding to a user terminal, the first interface sends an authentication request packet including terminal information of the user terminal to an AAA server. The AAA server notifies a second interface already accessed by the user terminal to delete a user entry corresponding to the user terminal when determining that the user terminal is an authenticated terminal and a roaming terminal, and sends an authentication success packet to the first interface when determining the deletion is completed, so that the first interface allows access of the user terminal and records the user entry corresponding to the user terminal in the first interface.

10 Claims, 4 Drawing Sheets

(56) References Cited

U.S. PATENT DOCUMENTS

| | | | |
|---|---|---|---|
| 2008/0301790 A1 | 12/2008 | Halasz et al. | |
| 2012/0289198 A1 | 11/2012 | Frank et al. | |
| 2013/0265941 A1 | 10/2013 | Chang et al. | |
| 2014/0273958 A1* | 9/2014 | Messana | H04L 63/0892 455/411 |
| 2016/0088475 A1* | 3/2016 | Zhang | H04W 12/06 726/7 |
| 2016/0241515 A1 | 8/2016 | Pai et al. | |

FOREIGN PATENT DOCUMENTS

| | | | |
|---|---|---|---|
| CN | 102075904 A | 5/2011 | |
| CN | 102369750 A | 3/2012 | |
| CN | 103634776 A | 3/2014 | |
| CN | 104038917 A | 9/2014 | |
| CN | 105101152 A | 11/2015 | |
| CN | 105744579 A | 7/2016 | |
| CN | 106230668 A | 12/2016 | |
| CN | 107820246 A | 3/2018 | |
| CN | 107995070 A | 5/2018 | |
| CN | 108429773 A | 8/2018 | |
| CN | 109067788 A | 12/2018 | |
| EP | 2768180 A1 | 8/2014 | |

OTHER PUBLICATIONS

ISA State Intellectual Property Office of the People's Republic of China, International Search Report Issued in Application No. PCT/CN2019/106605, dated Dec. 18, 2019, WIPO, 4 pages.

Jun Jiang,"Study on the Interworking Deployment of WLAN and LTE", Post and Telecommunications Design Technology, Nov. 30, 2014, 5 pages.

European Patent Office, Extended European Search Report Issued in Application No. 19863952.8, dated Sep. 1, 2021, Germany, 10 pages.

ISA State Intellectual Property Office of the People's Republic of China, Written Opinion of the International Searching Authority Issued in Application No. PCT/CN2019/106605, dated Dec. 18, 2019, WIPO, 11 pages.

Motorola et al, "Impacts of multiple PDN on detach and PON-disconnection procedure for PMIP-based S5/S8 and S2a",3GPP TSG-SA2 Meeting #64, S2-083549,Revised from: S2-082071, Jeju, S. Korea, Apr. 7-12, 2008, 7 pages.

Japanese Patent Office Action, Office Action Issued in Application No. 2021-512270, dated Apr. 19, 2022, 4 pages. (Submitted with Machine Translation).

European Patent Office, Office Action issued in Application No. 19863952.8, dated Dec. 16, 2022, Netherlands, 7 pages.

* cited by examiner

ACCESS AUTHENTICATING

CROSS-REFERENCE TO RELATED APPLICATIONS

The present application is the U.S. national phase of international application PCT/CN2019/106605 filed on Sep. 19, 2019, claiming priority to Chinese Patent Application No. 201811109298.4, entitled "METHOD AND APPARATUS FOR AUTHENTICATING ACCESS", filed on Sep. 21, 2018, the entire contents of which are incorporated herein by reference.

BACKGROUND

Currently, with continuous development of Internet market, more and more users access a metropolitan area network and service demands of users grow increasingly. As a result, a Broadband Remote Access Server (BRAS) emerges. The BRAS has flexible access authentication manners, effective address management function, and strong user management function and also provides rich and flexible service and control functions.

However, with popularization of mobile network devices and wireless services, a user terminal will not just stay at a position. For example, a mobile device accessing a network and held by a user in hand may roam from one access point (AP) to another AP. Due to change of the access points, different access points may correspondingly connect with different access interfaces of a BRAS device or even different BRAS devices. Thus, the user terminal may roam from one access interface of a particular BRAS device to another access point of the BRAS device or from one BRAS device to another BRAS device when roaming from one access point to another access point.

DETAILED DESCRIPTION OF THE EMBODIMENTS

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of an apparatus and a method consistent with some aspects of the present disclosure described in detail in the appended claims.

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

Figure 1:
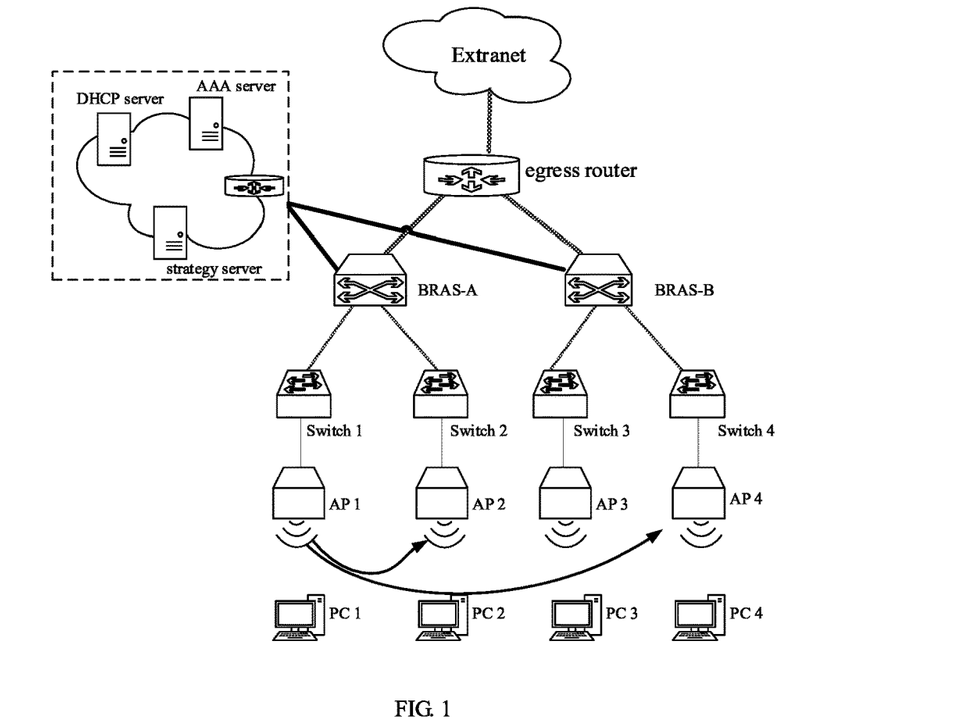
FIG. 1 is a schematic diagram illustrating a network of a BRAS according to an example of the present disclosure.

Refer to FIG. 1, which is a schematic diagram illustrating a network of BRAS devices according to an example of the present disclosure. A user terminal (for example, a personal computer (PC) 1) accesses a network from a switching device (for example, switch 1) through AP 1, PC 2 accesses a network from switch 2 through AP 2. PC 1 and PC 2 both are assigned an address and authenticated for access to network by BRAS-A. PC 3 accesses a network from switch 3 through AP 3 and PC 4 accesses a network from switch 4 through AP 4. PC 3 and PC 4 both are assigned an address and authenticated for access to network by BRAS-B.

In the prior art, after the user terminal goes online at a first interface of a BRAS device, the BRAS device may record user information corresponding to the user terminal, including an access position and an internet protocol (IP) address of the user terminal. While the user information remains valid, if a second interface of the BRAS device receives an IP packet bearing the IP address, it is considered that the user terminal is in a roaming state. At this time, the BRAS device modifies the recorded user information so as to migrate the user information to the second interface newly accessed by the user terminal during roam.

However, in the prior art, user information successfully authenticated is recorded by a BRAS device and the user information is not available to other BRAS devices. Therefore, in the prior art, only the roaming problem that a user terminal accesses a different interface of the same BRAS device is solved. For a roam across BRAS devices, the user terminal is enabled to access a BRAS device corresponding to a position after roam through re-authentication of the user terminal by the BRAS device. For example, after PC 1 is successfully authenticated on the BRAS-A device, when PC 1 roams to AP 3 or AP 4, because AP 3 and AP 4 correspond to BRAS-B device, the BRAS device accessed by the PC 1 changes. Therefore, PC 1 is to go through access authentication again, thus affecting smoothness and convenience of accessing a network by a user.

To solve the problems of the prior art, the present disclosure provides a method and an apparatus for authenticating an access. When no user entry corresponding to a user terminal is found, a first interface of a BRAS device sends an authentication request packet including terminal information of the user terminal to an Authentication, Authorization, Accounting server (AAA server). When determining the user terminal is an authenticated terminal and a roaming terminal based on the terminal information of the user terminal, the AAA server notifies a second interface (an interface of the same BRAS device or an interface of another BRAS device) already accessed by the user terminal to delete the user entry corresponding to the user terminal. When determining the deletion is completed, the AAA server sends an authentication success packet to the first interface so that the first interface allows access of the user terminal. A user entry corresponding to the user terminal is recorded in the first interface. In the present disclosure, the AAA server records the terminal information of the authenticated user terminal so that an interface of a BRAS device corresponding to a new position to which the user terminal roams sends an authentication request packet including the terminal information to the AAA server. After determining that the user terminal is an authenticated terminal and a roaming terminal, the AAA server allows the user terminal to access the network at the new position, thereby avoiding access authentication of the user terminal again after roam and improving user experiences.

Figure 2:
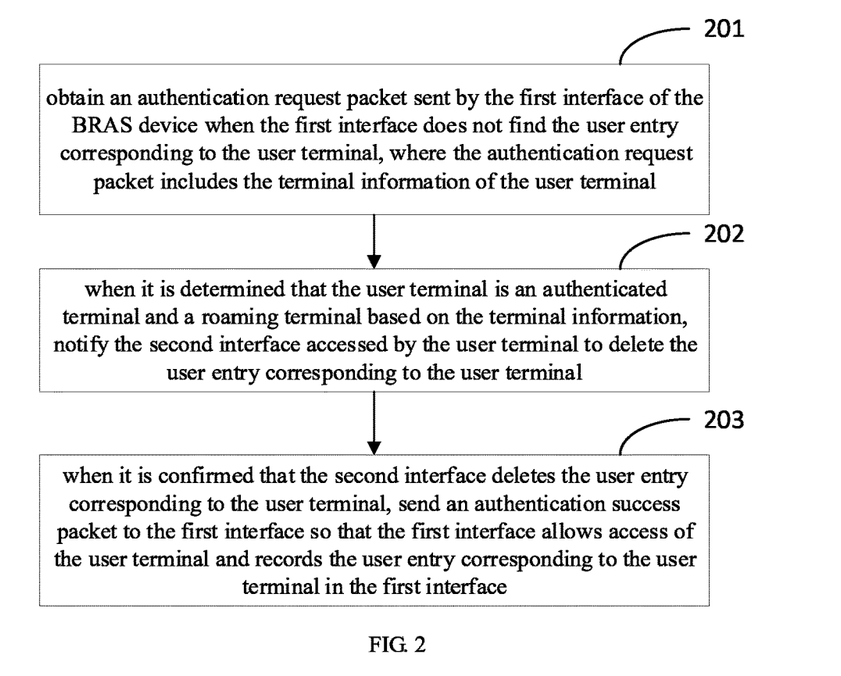
FIG. 2 is a flowchart illustrating a method of authenticating an access according to an example of the present disclosure.

FIG. 2 is a flowchart illustrating a method of authenticating an access according to an example of the present disclosure. The method may be applied to the AAA server and may include the following blocks.

At block 201, the AAA server obtains an authentication request packet sent by the first interface of the BRAS device when the first interface does not find the user entry corresponding to the user terminal, where the authentication request packet includes the terminal information of the user terminal.

In an example of the present disclosure, when the user terminal goes online from the first interface of the BRAS device, because the user terminal does not access the first interface previously, the user entry corresponding to the user terminal is not recorded in the first interface of the BRAS device. When accessing the first interface, the user terminal sends to the first interface an IP packet which includes the terminal information. The BRAS device may obtain the terminal information of the user terminal by receiving the IP packet from the user terminal. The terminal information is used to distinguish different user terminals.

As a non-limiting example, the terminal information may include a source IP address of a user terminal, a source Media Access Control (MAC) address of the user terminal and access position information of the user terminal. The access position information may include a BRAS device accessed, an interface accessed, a Virtual Local Area Network (VLAN) and the like.

The first interface of the BRAS device sends the authentication request packet including the terminal information to the AAA server to perform authentication for the user terminal.

As a result, the AAA server may obtain the authentication request packet including the terminal information from the first interface of the BRAS device when the first interface of the BRAS device does not find the user entry corresponding to the user terminal.

At block 202, when determining that the user terminal is an authenticated terminal and a roaming terminal based on the terminal information, the AAA server notifies the second interface already accessed by the user terminal to delete the user entry corresponding to the user terminal.

In an example of the present disclosure, when the AAA server determines that the user terminal is an authenticated terminal and roams from the second interface to the first interface according to the terminal information, because the user entry of the user terminal is still recorded in the second interface, the AAA server still continues performing accounting for traffic of the user terminal; further, part of the traffic of the user terminal may be wrongly forwarded based on the user entry recorded in the second interface, therefore, the user entry that corresponds to the user terminal and is recorded in the second interface is to be deleted.

Further, if no authenticated user information is found, it indicates that the user terminal is not authenticated previously. At this time, the AAA server feeds back an authentication failure packet to the BRAS device so that the BRAS device determines the user terminal as an unauthenticated terminal. In this way, the BRAS device performs authentication for the user terminal according to an existing authentication manner and sends an authentication request packet to the AAA server again after a successful authentication.

At block 203, when confirming that the second interface deletes the user entry corresponding to the user terminal, the AAA server sends an authentication success packet to the first interface so that the first interface allows access of the user terminal and records the user entry corresponding to the user terminal in the first interface.

In an example of the present disclosure, when confirming that the second interface deletes the user entry of the user terminal, the AAA server may feed back the authentication success packet in response to the authentication request packet to the first interface of the BRAS device. When receiving the authentication success packet, the first interface determines the user terminal is an authenticated terminal, allows access of the user terminal and records the user entry corresponding to the user terminal locally.

Compared with the prior art, the present disclosure may improve service processing flows of the AAA server and the BRAS device. The AAA server may identify that the user terminal is in a roaming state based on a feature of the user terminal, then notify the interface of a corresponding BRAS device accessed before roam to delete the user entry recorded in the interface by sending a DM message, and achieve unperceivable authentication to allow the user terminal to go online at the new position. In this way, duplicate access authentication of the user terminal is avoided, thereby improving the user accessing experiences.

Optionally, after obtaining the terminal information, the AAA server may search for authenticated user information corresponding to the user terminal locally based on the terminal information. If the authenticated user information is found, it indicates that the user terminal is an authenticated terminal. Afterwards, the AAA server further determines whether access position information in the authenticated user information is same as the access position information included in the terminal information. If the access position information is the same, it indicates that the user terminal is not a roaming terminal. At this time, the AAA server drops the authentication request packet. If the access position information is not the same, it indicates that the user terminal is a roaming terminal. At this time, the AAA server notifies the second interface already accessed by the user terminal to delete the user entry corresponding to the user terminal.

Optionally, when the access position information in the terminal information indicates that the user terminal roams between different interfaces of the present BRAS device, it indicates that the second interface and the first interface both are on the present BRAS device. As a result, the AAA server may notify the second interface that is on the present BRAS device and accessed by the user terminal to delete the user entry corresponding to the user terminal. When the access position information of the terminal information indicates that the user terminal roams to another BRAS device, it indicates that the second interface and the first interface are on different BRAS devices. Thus, the AAA server may notify the second interface that is on a different BRAS device and accessed by the user terminal to delete the user entry corresponding to the user terminal.

Optionally, in an example, the AAA server may send a notification offline message, for example, a Disconnect Management (DM) request message, to the second interface. The notification offline message includes the terminal information of the user terminal. When receiving the notification offline message from the AAA server, the second interface deletes the user entry that corresponds to the user terminal and is stored in the second interface itself. Afterwards, the second interface feeds back an offline confirmation message, for example, a DM confirmation message, to the AAA server. When receiving the offline confirmation message from the second interface, the AAA server may confirm that the deletion of the user entry corresponding to the user terminal and recorded on the second interface is completed.

Figure 3:
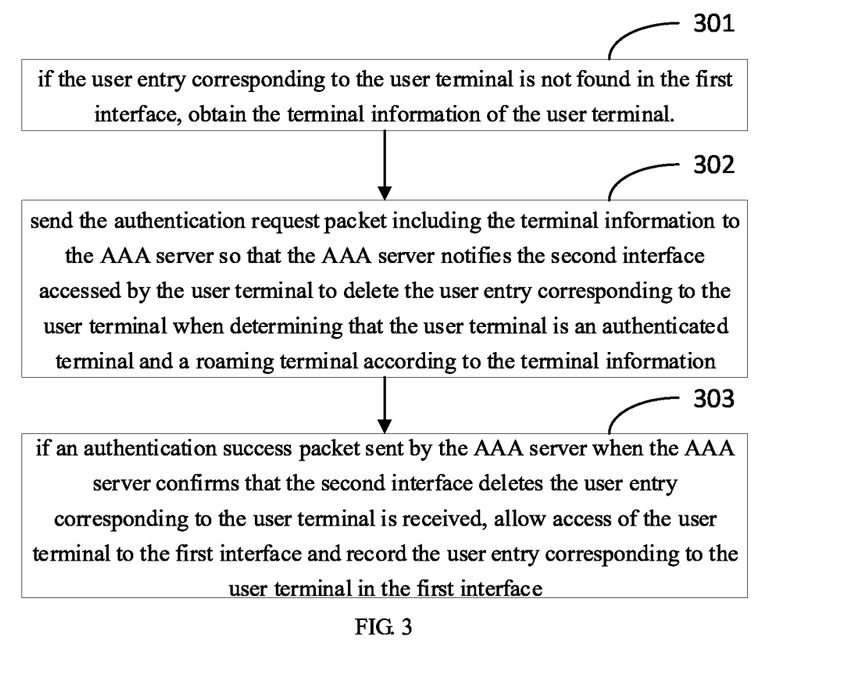
FIG. 3 is a flowchart illustrating a method of authenticating an access according to another example of the present disclosure.

Refer to FIG. 3, which is a flowchart illustrating a method of authenticating an access according to another example of the present disclosure. The method may be applied to a BRAS device and may include the following blocks.

At block 301, if the user entry corresponding to the user terminal is not found in the first interface, the BRAS device obtains the terminal information of the user terminal.

In an example of the present disclosure, when the user terminal goes online from the first interface of the BRAS device, the BRAS device may search for the user entry corresponding to the user terminal in the first interface according to a traffic feature. Because the user terminal has not access the first interface previously, the user entry of the user terminal is not recorded in the first interface. In this case, the first interface may forward the traffic sent by the user terminal to a Central Processing Unit (CPU) of the BRAS device so that the CPU analyzes the terminal information in the traffic. The terminal information is used to distinguish different terminals.

Optionally, the terminal information may include the source IP address, the source MAC address and the access position information of the user terminal, where the access position information may include a BRAS device accessed, an interface accessed, and VLAN and the like.

At block 302, the first interface of the BRAS device sends an authentication request packet including the terminal information to the AAA server so that the AAA server notifies the second interface already accessed by the user terminal to delete the user entry corresponding to the user terminal when determining that the user terminal is an authenticated terminal and a roaming terminal according to the terminal information.

After obtaining the terminal information corresponding to the user terminal, the first interface of the BRAS device may send the authentication request packet including the terminal information of the user terminal to the AAA server. In this way, the AAA server may determine the user terminal is an authenticated terminal and a roaming terminal after receiving the terminal information and notify the second interface already accessed by the user terminal to delete the locally stored user entry corresponding to the user terminal.

At block 303, if the first interface of the BRAS device receives an authentication success packet from the AAA server when the AAA server confirms that the second interface deletes the user entry corresponding to the user terminal, the first interface of the BRAS device allows access of the user terminal and record the user entry corresponding to the user terminal in the first interface.

When confirming that the second interface deletes the user entry corresponding to the user terminal, the AAA server may feed back the authentication success packet in response to the authentication request packet sent by the first interface. When receiving the authentication success packet from the AAA server, the first interface determines that the user terminal is an authenticated terminal, allows the user terminal to access the first interface and record the user entry corresponding to the user terminal locally.

As a result, in the present disclosure, when no user entry corresponding to the user terminal is found, the first interface of the BRAS device may send the authentication request packet including the terminal information of the user terminal to the AAA server. When determining that the user terminal is an authenticated terminal or a roaming terminal, the AAA server may notify the second interface accessed by the user terminal to delete the user entry corresponding to the user terminal, and send the authentication success packet to the first interface when the second interface confirms that the deletion is completed. In this way, the first interface allows access of the user terminal and records the user entry corresponding to the user terminal in the first interface. Therefore, in the present disclosure, the terminal information of the authenticated terminal is recorded by the AAA server so that an interface of a BRAS device corresponding to a new position to which the user terminal roams sends the authentication request packet including the terminal information to the AAA server. After the AAA server determines the authenticated identity of the user terminal, the user terminal is allowed to access the network at the new position, thereby avoiding duplicated access authentication of the user terminal after roam and improving user experiences.

Optionally, when the present BRAS device receives the notification offline message including the terminal information sent by the AAA server to the second interface of the present BRAS device, it is considered that the user terminal roams from the second interface of the present BRAS device to the first interface. Therefore, the user entry that corresponds to the user terminal and is stored on the second interface may be deleted so that the terminal may access the first interface after roam. After determining that the user entry corresponding to the user terminal is deleted, the second interface may feed back offline confirmation message to the AAA server. When receiving the offline confirmation message, the AAA server may confirm the second interface has deleted the user entry corresponding to the user terminal. In this way, the user terminal is allowed to access the network through the first interface after roam.

Figure 4:
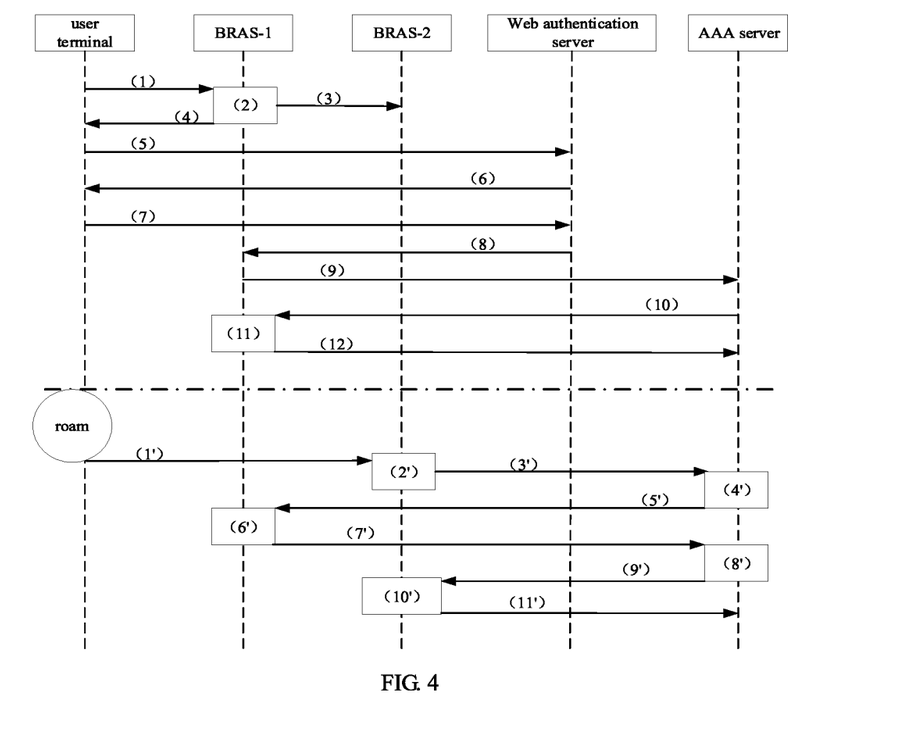
FIG. 4 is a flowchart illustrating interactions before roam and after roaming to an interface of another BRAS device according to an example of the present disclosure.

To make the object, technical solutions and advantages of the present disclosure more clear, detailed descriptions are made to the solutions of the present disclosure with roam across BRAS devices as an example in combination with FIG. 4.

FIG. 4 is flowchart illustrating interactions of a user terminal before roam and after roaming to an interface of another BRAS device according to an example of the present disclosure.

The interaction flow of the user terminal before roam is as follows:

(1) When the user terminal requests access to a network through an interface of BRAS-1, the user terminal sends an HTTP request to the interface of BRAS-1.

(2) Because a user entry corresponding to the user terminal is not recorded in the interface of BRAS-1, BRAS-1 redirects the HTTP request to an authentication page of a Web authentication server.

(3) BRAs-1 accesses the authentication page of the Web authentication server.

(4) The BRAS-1 pushes a Uniform Resource Locator (URL) corresponding to the authentication page of the Web authentication server to the user terminal.

(5) The user terminal may request Web authentication from the Web authentication server based on the URL corresponding to the authentication page when receiving the URL.

(6) The Web authentication server feeds back contents of the Web authentication page to the user terminal.

(7) The user terminal inputs a username and a password of Web authentication based on the contents of the Web authentication page and sends the username and the password of the Web authentication to the Web authentication server.

(8) The Web authentication server performs authentication after receiving the username and the password and sends Web authentication information to BRAS-1.

(8) BRAS-1 sends an access authentication request of the user terminal to the AAA server. The access authentication request includes the username and password of Web authentication, and terminal information (such as an IP address, an MAC address and access position information of the user terminal).

(10) When determining that the user terminal is successfully authenticated based on the access authentication request, the AAA server sends an authentication reply to BRAS-1.

(11) After BRAS-1 receives the authentication reply, the interface of BRAS-1 device locally records the user entry of the user terminal including terminal information and the username and the password of Web authentication, and distributes a permission to the user terminal to allow the user terminal to access the network.

(12) When the user terminal starts to access the network, the interface of BRAS-1 device sends accounting start message to the AAA server. The accounting start message includes the terminal information of the user terminal so that the AAA server starts accounting for the user terminal.

When the user terminal roams from the interface of BRAS-1 to the interface of BRAS-2, the interaction flow after roam is as follows:

(1') After going online from an interface of BRAS-2, the user terminal sends a packet (IP and Address Resolution Protocol (ARP)) to BRAS-2.

(2') After receiving the packet from the user terminal, the interface of BRAS-2 extracts the terminal information of the packet (such as the IP address, the MAC address and the access position information of the user terminal).

(3') Because the user terminal accesses the interface of BRAS-2 for the first time, the user entry of the user terminal is not recorded in the interface of BRAS-2. In this case, the interface of BRAS-2 may send an authentication request packet to the AAA server. The authentication request packet includes the terminal information of the user terminal.

(4') After receiving the authentication request packet from BRAS-2, the AAA server searches for the terminal information corresponding to the user terminal locally. Since the user terminal has been successfully authenticated at the interface of BRAS-1 previously, the AAA server may obtain the terminal information corresponding to the user terminal so as to determine the user terminal has already been authenticated successfully.

(5') Because the user terminal already goes online at the interface of BRAS-2 and the AAA server detects that the user entry of the user terminal is still stored in the interface of BRAS-1, the AAA server sends a DM request message to the interface of BRAS-1.

(6') After receiving the DM request message, the interface of BRAS-1 deletes the user entry that corresponds to the user terminal and is stored in the interface, and sends an accounting stop message to the AAA server.

(7') The interface of BRAS-1 replies with a DM confirmation message to the AAA server.

(8') When receiving the DM confirmation message, the AAA server may change the locally recorded access position of the user terminal from the interface of BRAS-1 to the interface of BRAS-2.

(9') The AAA server sends an authentication reply packet to the interface of BRAS-2.

(10') After receiving the authentication reply packet, the interface of BRAS-2 determines the user terminal is already authenticated. In this case, the interface of BRAS-2 may record the user entry of the user terminal and distribute a permission to the user terminal to allow the user terminal to access a network.

(11') When the user terminal starts to access the network, the interface of BRAS-2 sends an accounting start message to the AAA server. The accounting start message includes the terminal information of the user terminal so that the AAA server starts accounting for the user terminal.

Therefore, in the present disclosure, the user is not required to re-enter the username and the password when roaming between different BRAS devices. In this way, the user may roam unperceivably, thereby improving the user access experiences.

Based on the same idea, the present disclosure further provides an apparatus for authenticating an access. The apparatus may be implemented by software or may be implemented by hardware or a combination of hardware and software. Taking software implementation as an example, the apparatus for authenticating an access according to the present disclosure serves as a logical apparatus which is implemented by reading and running corresponding computer program instructions stored on a memory through a CPU of the apparatus.

Figure 5:
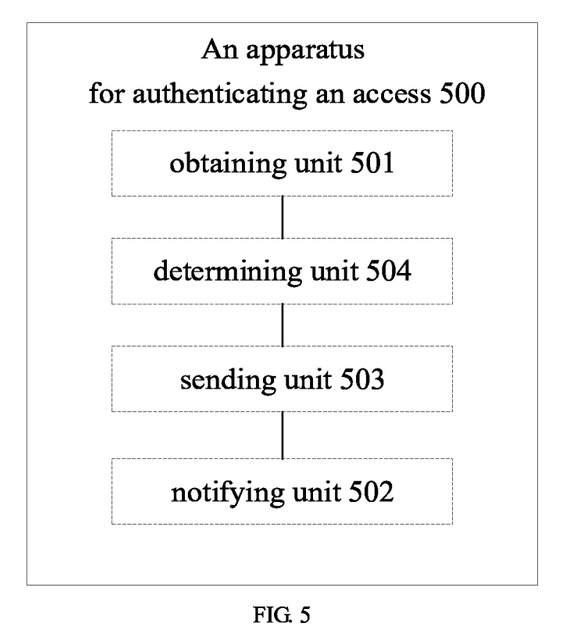
FIG. 5 is schematic diagram illustrating a logic structure of an apparatus for authenticating an access according to an example of the present disclosure.

Refer to FIG. 5, which illustrates an apparatus 500 for authenticating an access according to an example of the present disclosure. The apparatus may be applied to an AAA server. The basic running environment of the apparatus includes a CPU, a memory, and other hardware. From the logical level, the apparatus 500 may include the following units:

An obtaining unit 501, configured to obtain an authentication request packet sent by a first interface of a BRAS device when the first interface does not find a user entry corresponding to a user terminal, where the authentication request packet includes terminal information of the user terminal.

A notifying unit 502, configured to notify a second interface already accessed by the user terminal to delete the user entry corresponding to the user terminal when it is determined that the user terminal is an authenticated terminal and a roaming terminal according to the terminal information.

A sending unit 503, configured to send an authentication success packet to the first interface when confirming the second interface deletes the user entry corresponding to the user terminal, so that the first interface allows access of the user terminal and record the user entry corresponding to the user terminal in the first interface.

In an example, the apparatus further includes a determining unit 504.

The determining unit 504 is configured to locally search for authenticated user information corresponding to the user terminal based on the terminal information; if the authenticated user information is found, the determining unit determines whether access position information of the authenticated user information is same as access position information of the terminal information; if the access position information of the authenticated user information is the same as the access position information of the terminal information, the authentication request packet is dropped, and if the access position information of the authenticated user information is not the same as the access position information of the terminal information, the determining unit determines that the terminal is an authenticated terminal and a roaming terminal and then notifies the second interface already accessed by the user terminal to delete the user entry corresponding to the user terminal.

In an example, the notifying unit 502 is specifically configured to notify the second interface that is on the present BRAS device and accessed by the user terminal to delete the user entry corresponding to the user terminal when the access position information of the terminal information indicates that the user terminal roams between different interfaces of the present BRAS device; or, notify the second interface that is on a different BRAS device and accessed by the user terminal to delete the user entry corresponding to the user terminal when the access position information of the terminal information indicates that the user terminal roams on the different BRAS device.

In an example, the notifying unit 502 is specifically configured to send a notification offline message including the terminal information to the second interface so that the second interface feeds back an offline confirmation message to the AAA server after deleting the locally-stored user entry corresponding to the user terminal when receiving the notification offline message.

The sending unit 503 is specifically configured to confirm that the second interface deletes the user entry corresponding to the user terminal if receiving the offline confirmation message from the second interface.

Figure 6:
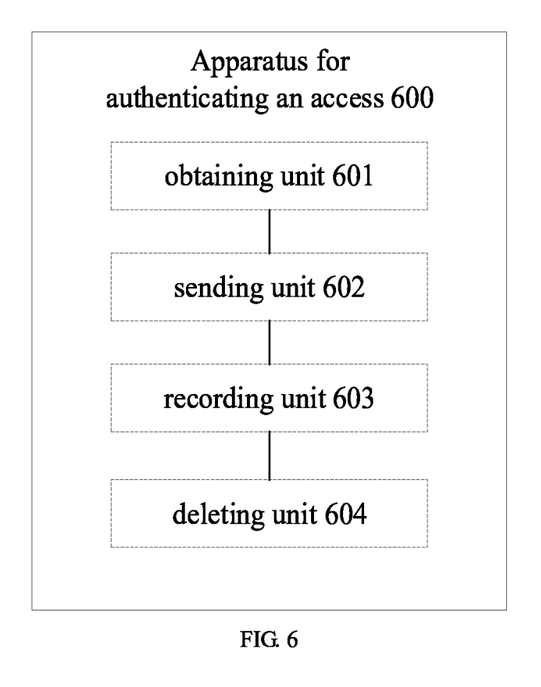
FIG. 6 is a schematic diagram illustrating a logic structure of an apparatus for authenticating an access according to another example of the present disclosure.

FIG. 6 illustrates an apparatus 600 for authenticating an access according to another example of the present disclosure. The apparatus may be applied to a BRAS device. The basic running environment of the apparatus includes a CPU, a memory and other hardware. From the logical level, the apparatus 600 includes the following units:

An obtaining unit 601 configured to obtain terminal information of a user terminal if a first interface does not find a user entry corresponding to the user terminal.

A sending unit 602 configured to send an authentication request packet including the terminal information to an AAA server so that the AAA server notifies a second interface already accessed by the user terminal to delete a user entry corresponding to the user terminal when determining that the user terminal is an authenticated terminal and a roaming terminal according to the terminal information.

A recording unit 603 configured to allow the user terminal to access the first terminal and record the user entry corresponding to the user terminal in the first interface if receiving an authentication success packet from the AAA server when the AAA server confirms that the second interface deletes the user entry corresponding to the user terminal.

In an example, the apparatus further includes a deleting unit 604.

The deleting unit 604 is configured to delete the user entry that corresponds to the user terminal and is locally stored by the second interface when receiving a notification offline message including the terminal information sent by the AAA server to the second interface of the present BRAS device; feed back an offline confirmation message to the AAA server so that the AAA server confirms the second interface deletes the user entry corresponding to the user terminal when receiving the offline confirmation message.

Figure 7:
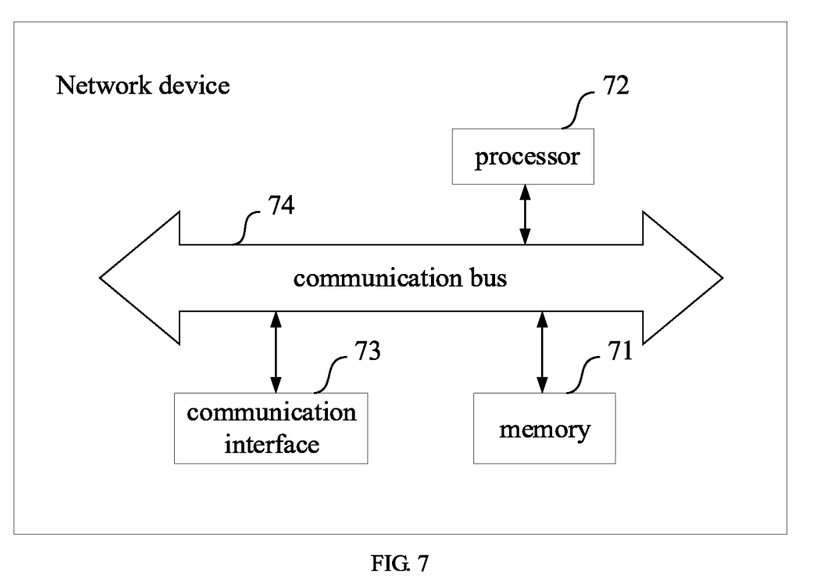
FIG. 7 is a schematic diagram illustrating a hardware structure of a network device according to an example of the present disclosure.

Based on the same idea, the present disclosure further provides a AAA server. As shown in FIG. 7, the AAA server includes a memory 71, a processor 72, a communication interface 73 and a communication bus 74. The memory 71, the processor 72, and the communication interface 73 communicate with each other via the communication bus 74.

The memory 71 is configured to store computer programs.

The processor 72 is configured to execute the computer programs stored on the memory 71. When executing the computer programs, the processor 72 is caused to perform the following operations:

obtaining an authentication request packet from a first interface of a Broadband Remote Access Server (BRAS) when the first interface does not find a user entry corresponding to a user terminal, wherein the authentication request packet comprises terminal information of the user terminal;

when determining that the user terminal is an authenticated terminal and a roaming terminal based on the terminal information, notifying a second interface already accessed by the user terminal to delete a user entry corresponding to the user terminal;

when confirming that the second interface deletes the user entry corresponding to the user terminal, sending, via the communication interface 73, an authentication success packet to the first interface so that the first interface allows access of the user terminal and records the user entry corresponding to the user terminal in the first interface.

Optionally, when determining that the user terminal is an authenticated terminal and a roaming terminal based on the terminal information, the processor 72 is caused to perform the following operations:

searching for authenticated user information corresponding to the user terminal on the AAA server based on the terminal information;

when the authenticated user information is found, determining whether access position information of the authenticated user information is same as access position information of the terminal information;

if the access position information of the authenticated user information is the same as the access position information of the terminal information, dropping the authentication request packet; and if the access position information of the authenticated user information is not the same as the access position information of the terminal information, determining the user terminal is an authenticated terminal and a roaming terminal.

Optionally, when notifying the second interface already accessed by the user terminal to delete the user entry corresponding to the user terminal, the processor 72 is caused to perform the following operations:

when the access position information of the terminal information indicates that the user terminal roams between different interfaces of the BRAS device, notifying, via the communication interface 73, the second interface already accessed by the user terminal to delete the user entry corresponding to the user terminal, wherein the second interface is located on the BRAS device; and when the access position information of the terminal information indicates that the user terminal roams on a second BRAS device other than the BRAS device, notifying, via the communication interface 73, the second interface already accessed by the user terminal to delete the user entry corresponding to the user terminal wherein the second interface is located on the second BRAS device.

Optionally, when notifying the second interface already accessed by the user terminal to delete the user entry corresponding to the user terminal, the processor 72 is caused to perform the following operations:

sending, via the communication interface 73, a notification offline message comprising the terminal information to the second interface so that the second interface feeds back an offline confirmation message to the AAA server after deleting the stored user entry corresponding to the user terminal when receiving the notification offline message;

confirming the second interface deletes the user entry corresponding to the user terminal specifically comprises:

when the offline confirmation message is received from the second interface, confirming the second interface deletes the user entry corresponding to the user terminal.

Based on the same idea, the present disclosure further provides a BRAS device, the hardware structure of the BRAS device is the same as that shown in FIG. 7, therefor is not shown delicately. The BRAS device includes a memory, a processor, a communication interface and a communication bus. The memory, the processor, and the communication interface communicate with each other via the communication bus.

The memory is configured to store computer programs.

The processor is configured to execute the computer programs stored on the memory. When executing the computer programs, the processor is caused to perform the following operations:

when a user entry corresponding to a user terminal is not found on a first interface, obtaining terminal information of the user terminal;

sending, by the first interface via the communication interface, an authentication request packet comprising the terminal information to an Authentication, Authorization, Accounting server (AAA server), so that the AAA server notifies a second interface already accessed by the user terminal to delete a user entry corresponding to the user terminal when determining the user terminal is an authenticated terminal and a roaming terminal based on the terminal information; and if an authentication success packet is received from the AAA server when the AAA server confirms that the second interface deletes the user entry corresponding to the user terminal, allowing the user terminal to access the first interface and recording the user entry corresponding to the user terminal in the first interface.

Optionally, the processor is further caused to perform the following operations:

when a notification offline message comprising the terminal information sent by the AAA server to the second interface of the BRAS device is received, deleting the user entry that corresponds to the user terminal and is stored on the second interface of the BRAS device; and feeding back, via the communication interface, an offline confirmation message to the AAA server so that the AAA server confirms the second interface deletes the user entry corresponding to the user terminal when the AAA server receives the offline confirmation message.

The present disclosure further provides a computer readable storage medium. The computer readable storage medium stores computer programs. When executing the computer programs, a processor is caused to perform any block of the method of authenticating an access according to an example of the present disclosure.

Different examples of the present disclosure are described in relevant manners. Reference may be made mutually to different examples for same or similar parts. The emphasis of each example is placed on the part different from other examples. In particular, since the examples of the network device and the computer readable storage medium are basically similar to the examples of the method, the examples of the network device and the computer readable storage medium are described simply and reference may be made to the examples of the method for related parts.

In conclusion, in the present disclosure, when no user entry corresponding to the user terminal is found, the first interface of the BRAS device may send the authentication request packet including the terminal information of the user terminal to the AAA server. When determining that the user terminal is an authenticated terminal and a roaming terminal, the AAA server may notify the second interface accessed by the user terminal to delete the user entry corresponding to the user terminal, and send the authentication success packet to the first interface when the second interface confirms that the deletion is completed. In this way, the first interface allows access of the user terminal and records the user entry corresponding to the user terminal in the first interface. Therefore, in the present disclosure, the terminal information of the authenticated terminal is recorded by the AAA server so that an interface of a BRAS device corresponding to a new position to which the user terminal roams sends the authentication request packet including the terminal information to the AAA server to determine the authenticated identity of the user terminal. In this way, the user terminal is allowed to access the network at the new position, thereby avoiding duplicated access authentication of the user terminal after roam and improving user experiences.

Details of the implementation process of the functions and effects of different units in the above-described apparatus may be seen from the implementation process of corresponding blocks in the above-described method, which will not be redundantly described herein.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and an apparatus according to the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting to the present disclosure.

The invention claimed is:

1. A method of authenticating an access, the method being applied to an Authentication, Authorization, Accounting (AAA) server, comprising:
   obtaining an authentication request packet from a first interface of a Broadband Remote Access Server (BRAS) device when the first interface does not find a user entry corresponding to a user terminal, wherein the authentication request packet comprises terminal information of the user terminal;
   when determining that the user terminal is an authenticated terminal and a roaming terminal based on the terminal information, notifying a second interface already accessed by the user terminal to delete a user entry corresponding to the user terminal; and
   when confirming that the second interface deletes the user entry corresponding to the user terminal, sending an authentication success packet to the first interface so that the first interface allows access of the user terminal and records the user entry corresponding to the user terminal in the first interface.

2. The method according to claim 1, wherein determining that the user terminal is an authenticated terminal and a roaming terminal based on the terminal information comprises:
   searching for authenticated user information corresponding to the user terminal on the AAA server based on the terminal information;
   when the authenticated user information is found, determining whether access position information of the authenticated user information is same as access position information of the terminal information;
   in response to determining that the access position information of the authenticated user information is the same as the access position information of the terminal information, dropping the authentication request packet; and
   in response to determining that the access position information of the authenticated user information is not the same as the access position information of the terminal information, determining the user terminal is an authenticated terminal and a roaming terminal.

3. The method according to claim 2, wherein notifying the second interface already accessed by the user terminal to delete the user entry corresponding to the user terminal comprises:
   when the access position information of the terminal information indicates that the user terminal roams between different interfaces of the BRAS device, notifying the second interface already accessed by the user terminal to delete the user entry corresponding to the user terminal, wherein the second interface is located on the BRAS device; and
   when the access position information of the terminal information indicates that the user terminal roams on a second BRAS device other than the BRAS device, notifying the second interface already accessed by the user terminal to delete the user entry corresponding to the user terminal wherein the second interface is located on the second BRAS device.

4. The method according to claim 1, wherein notifying the second interface already accessed by the user terminal to delete the user entry corresponding to the user terminal comprises:
   sending a notification offline message comprising the terminal information to the second interface so that the second interface feeds back an offline confirmation message to the AAA server after deleting the stored user entry corresponding to the user terminal when receiving the notification offline message;
   confirming the second interface deletes the user entry corresponding to the user terminal comprises:
   when the offline confirmation message is received from the second interface, confirming the second interface deletes the user entry corresponding to the user terminal.

5. A method of authenticating an access, the method being applied to a Broadband Remote Access Server (BRAS) device, comprising:
   when a user entry corresponding to a user terminal is not found on a first interface, obtaining terminal information of the user terminal;
   sending, by the first interface, an authentication request packet comprising the terminal information to an Authentication, Authorization, Accounting (AAA) server, so that the AAA server notifies a second interface already accessed by the user terminal to delete a user entry corresponding to the user terminal when determining the user terminal is an authenticated terminal and a roaming terminal based on the terminal information; and
   when an authentication success packet is received from the AAA server when the AAA server confirms that the second interface deletes the user entry corresponding to the user terminal, allowing the user terminal to access the first interface and recording the user entry corresponding to the user terminal in the first interface.

6. The method according to claim 5, further comprising:
   when a notification offline message comprising the terminal information sent by the AAA server to the second interface of the BRAS device is received, deleting the user entry that corresponds to the user terminal and is stored on the second interface of the BRAS device; and
   feeding back an offline confirmation message to the AAA server so that the AAA server confirms the second interface deletes the user entry corresponding to the user terminal when the AAA server receives the offline confirmation message.

7. An Authentication, Authorization, Accounting (AAA) server, comprising:
   a processor; and a memory storing machine executable instructions executable on the processor, wherein the processor executes the instructions to perform:
- obtaining an authentication request packet from a first interface of a Broadband Remote Access Server (BRAS) device when the first interface does not find a user entry corresponding to a user terminal, wherein the authentication request packet comprises terminal information of the user terminal;
- when determining that the user terminal is an authenticated terminal and a roaming terminal based on the terminal information, notifying a second interface already accessed by the user terminal to delete a user entry corresponding to the user terminal; and
- when confirming that the second interface deletes the user entry corresponding to the user terminal, sending an authentication success packet to the first interface so that the first interface allows access of the user terminal and records the user entry corresponding to the user terminal in the first interface.

8. The AAA server according to claim 7, wherein determining that the user terminal is an authenticated terminal and a roaming terminal based on the terminal information comprises:
- searching for authenticated user information corresponding to the user terminal on the AAA server based on the terminal information;
- when the authenticated user information is found, determining whether access position information of the authenticated user information is same as access position information of the terminal information;
- in response to determining that the access position information of the authenticated user information is the same as the access position information of the terminal information, dropping the authentication request packet; and
- in response to determining that the access position information of the authenticated user information is not the same as the access position information of the terminal information, determining the user terminal is an authenticated terminal and a roaming terminal.

9. The AAA server according to claim 8, wherein notifying the second interface already accessed by the user terminal to delete the user entry corresponding to the user terminal comprises:
- when the access position information of the terminal information indicates that the user terminal roams between different interfaces of the BRAS device, notifying the second interface already accessed by the user terminal to delete the user entry corresponding to the user terminal, wherein the second interface is located on the BRAS device; and
- when the access position information of the terminal information indicates that the user terminal roams on a second BRAS device other than the BRAS device, notifying the second interface already accessed by the user terminal to delete the user entry corresponding to the user terminal wherein the second interface is located on the second BRAS device.

10. The AAA server according to claim 7, wherein notifying the second interface already accessed by the user terminal to delete the user entry corresponding to the user terminal comprises:
- sending a notification offline message comprising the terminal information to the second interface so that the second interface feeds back an offline confirmation message to the AAA server after deleting the stored user entry corresponding to the user terminal when receiving the notification offline message;
- confirming the second interface deletes the user entry corresponding to the user terminal comprises:
- when the offline confirmation message is received from the second interface, confirming the second interface deletes the user entry corresponding to the user terminal.

* * * * *